United States Patent
Pham et al.

(10) Patent No.: US 6,357,006 B1
(45) Date of Patent: Mar. 12, 2002

(54) DIGITAL SIGNATURING METHOD AND SYSTEM FOR RE-CREATING SPECIALIZED NATIVE FILES FROM SINGLE WRAPPED FILES IMPORTED FROM AN OPEN NETWORK OR RESIDING ON A CD-ROM

(75) Inventors: Thien Huu Pham, Garden Grove; Lauren Ann Cotugno, Dove Canyon, both of CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/124,556

(22) Filed: Jul. 29, 1998

(51) Int. Cl.[7] .................................................. H04L 9/00
(52) U.S. Cl. ........................ 713/176; 713/151; 713/181; 380/282; 709/200; 707/200
(58) Field of Search ................................. 713/151, 168, 713/176, 181; 380/30; 709/206, 246, 247, 200, 220, 230, 231, 249, 250; 707/200, 906, 911

(56) References Cited

U.S. PATENT DOCUMENTS

| | | | |
|---|---|---|---|
| 5,581,558 A | * 12/1996 | Horney et al. | 370/401 |
| 5,655,140 A | * 8/1997 | Haddock | 395/200.76 |
| 5,978,815 A | * 11/1999 | Cabrera et al. | 707/204 |
| 5,983,295 A | * 11/1999 | Cotugno | 710/74 |
| 6,035,327 A | * 3/2000 | Buckley et al. | 709/206 |

* cited by examiner

*Primary Examiner*—Albert Decady
*Assistant Examiner*—Paul E. Callahan
(74) *Attorney, Agent, or Firm*—Alfred W. Kozak; Mark T. Starr; Lise A. Rode

(57) ABSTRACT

A method and system is provided whereby after specialized original native format files have been signatured and "wrapped" into industry standard byte stream text files for transmission over the Internet (or for use of other computer platforms), then subsequently, said wrapped files with signature can be accessed by the proprietary computer platform which will then use the signature to verify the integrity of the files and will unwrap or re-create these files back into the original specialized native format for use by the proprietary computer platform.

12 Claims, 9 Drawing Sheets

OVERVIEW OF VERIFYING AND UNWRAPPING SINGLE WRAPPED FILES

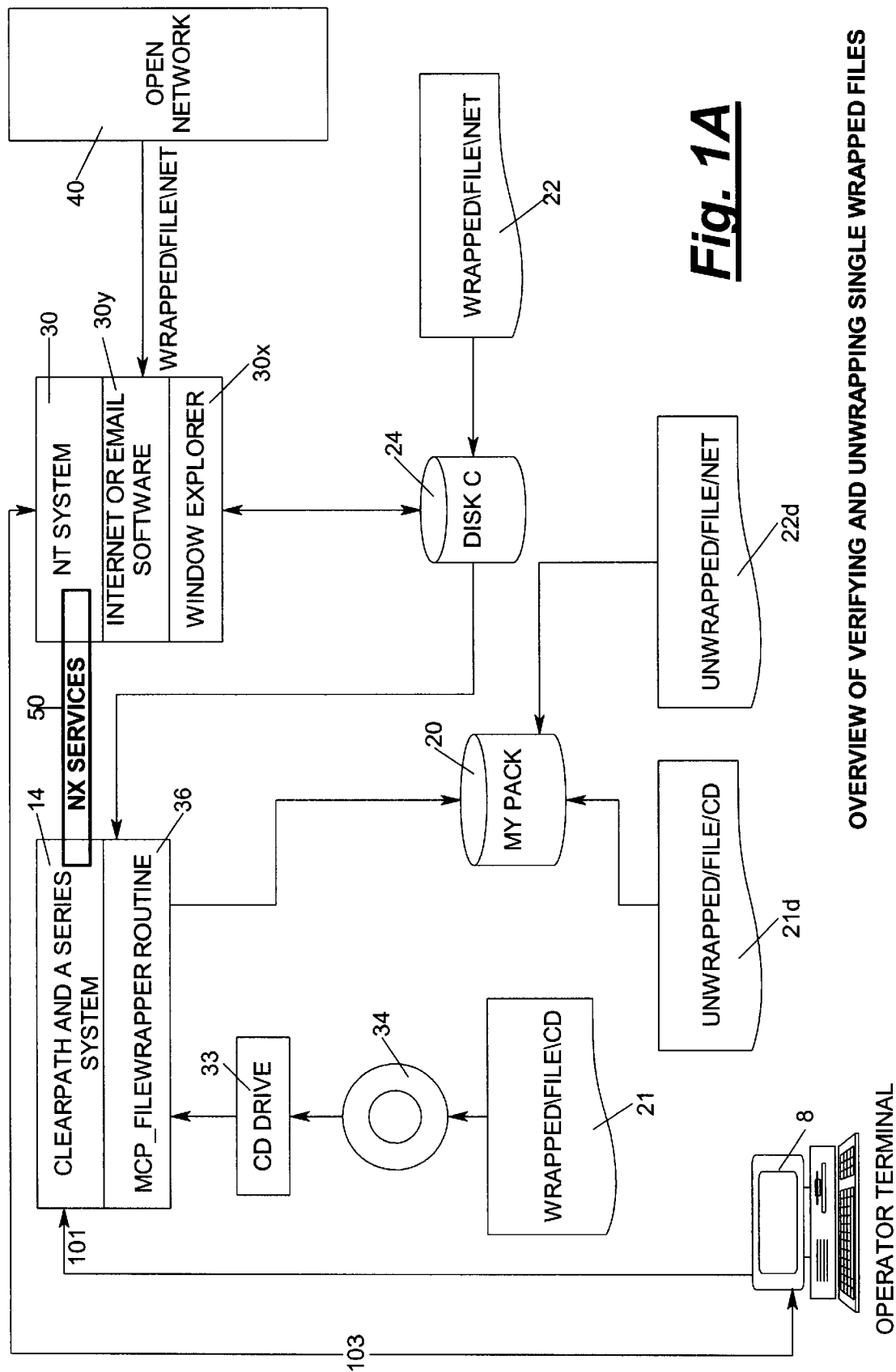

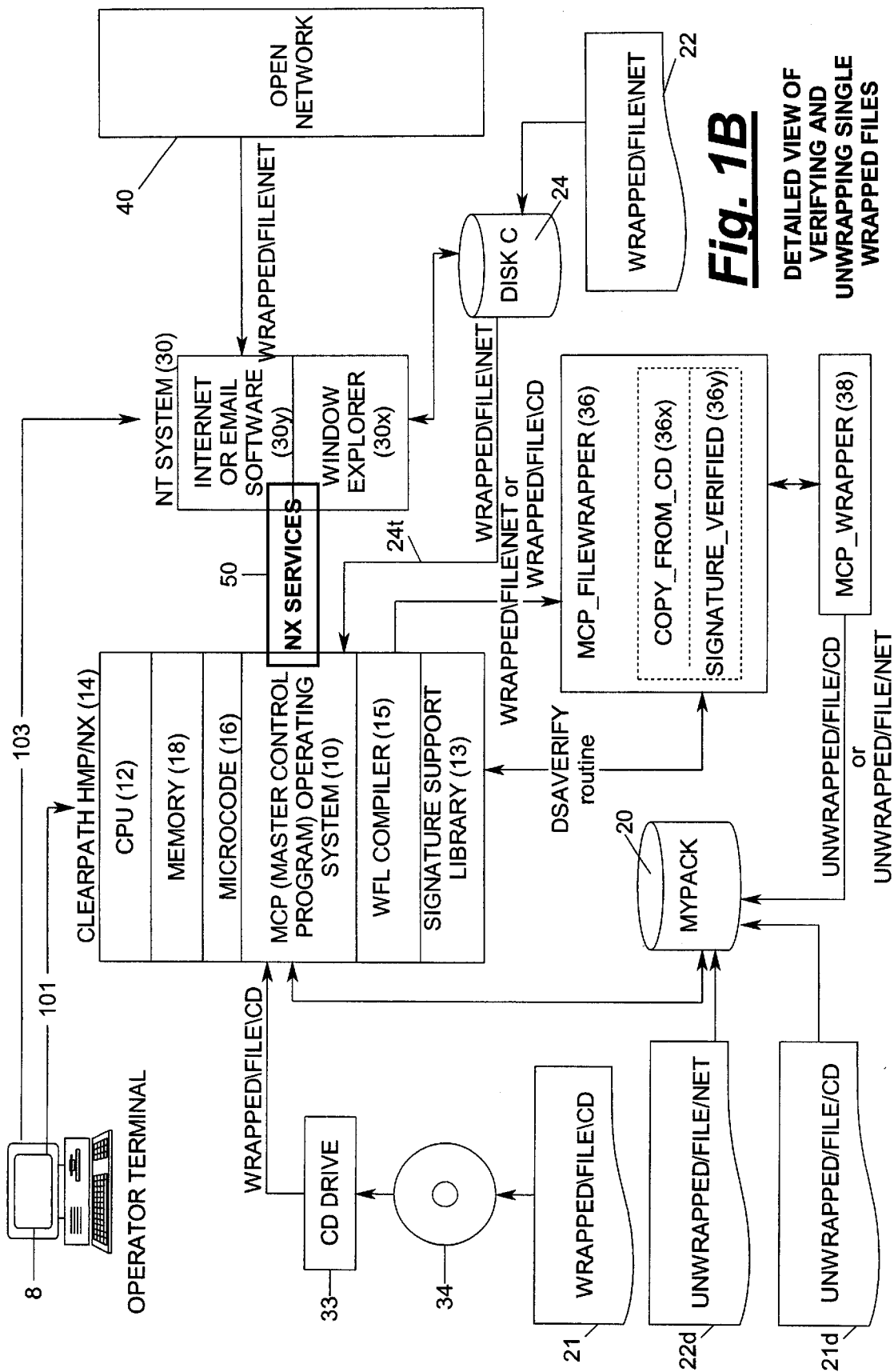
Fig. 1B DETAILED VIEW OF VERIFYING AND UNWRAPPING SINGLE WRAPPED FILES

| (i) | (ii) | (iii) | (iv) | (v) | (vi) DIGITAL SIGNATURE | |
|---|---|---|---|---|---|---|
| "UNISYS000010" | <OPTIONS> | THE A SERIES DISK FILE HEADER +HEADER CHECKSUM | <THE FILE> | <CHECKSUM> | R | S |

*FIG. 2*

THE OVERALL PROCESS OF VERIFYING
AND UNWRAPPING SINGLE FILES

MCP_FILEWRAPPER LOGIC TO DIGITALLY VERIFY
AND UNWRAP SINGLE FILES

MCP_WRAPPER's GENERALIZED LOGIC
FOR UNWRAP SINGLE WRAPPED FILE

SIGNATURE_VERIFIED LOGIC TO VERIFY SINGLE WRAPPED FILES

- CREATING A DSA KEYSFILE

— WRAP AND SIGNATURE A FILE

— VERIFY AND UWRAP A SIGNATURED FILE

DIGITAL SIGNATURING METHOD AND SYSTEM FOR RE-CREATING SPECIALIZED NATIVE FILES FROM SINGLE WRAPPED FILES IMPORTED FROM AN OPEN NETWORK OR RESIDING ON A CD-ROM

CROSS-REFERENCES TO RELATED APPLICATIONS

This application is related to co-pending application (i) U.S. Ser. No. 191,395 entitled "Digital Signaturing Method and System For Packaging Specialized Files For Open Network Transport And For Burning Onto CD-ROM; and co-pending application (ii) U.S. Ser. No. 08/989,738 entitled "System and Method for Unwrapping a Single File From a Compact Disk for Utilization by Various Computer Platforms" which has now issued as U.S. Pat. No. 6,085,266 and each of which are incorporated herein by reference.

FIELD OF THE INVENTION

This disclosure refers to methods of verifying and decoding (i.e, unwrapping) signatured single wrapped files residing on a compact disc or imported from an open network by converting them from a standard text file format to native proprietary type files usable on a proprietary computer system.

BACKGROUND OF THE INVENTION

In the usage of modern computer systems and networks, the situation arises where systems having one proprietary protocol and data format are connected to systems having different data formats and protocols. Thus in order to provide for systems integration in different networks, it is necessary that there be provided a system or method whereby the data formats of a first system can be transferred to and utilized by the network of a differently oriented system.

For example, the Unisys A Series computer systems involve a Central Processing Unit and memory together with storage such as disk storage which operates under the control of a Master Control Program. These A Series systems use a particular format for the data files compatible with the A Series software which can be placed on CD-ROMs. Thus, the CD-ROMs which contain this A Series software contain an image of a formatted tape which can be utilized only by the A Series systems.

However, when it is desirable to integrate a first system such as the A Series systems for operation with other platforms such as an NT system, then problems arise in that the second system such as the NT system, utilizes formats which are not compatible with the software formats of the A Series system, which is the first system.

Presently, the software for a first system, such as an A Series system with software, is utilized by providing methods to burn CD disks from a Library Maintenance formatted tape. This method has the limitation in that it limits the type of files that are burned into CD-ROMs to those of the native A Series files.

Now, in order to provide for system integration where an A Series system is to be coupled to a NT system, which overall system would be designated as a Unisys ClearPath system, the desirability here would be to make and use a single CD-ROM disk which would carry both the A series software and at the same time carry the NT software.

Thus in this regard, a method is needed to couple the A Series files with their native attributes and also arrange them in a format capable of being stored on a particular media such as a CD-ROM which will also hold the readable software for the NT system.

The same system or method also provides the ability to package files of a proprietary system in such a way that allows the files to be transported across an open (non-proprietary) network without losing their original characteristics. When such files return to their native environment, their true data formats can be restored.

For example, the A Series systems have files with specialized attributes such as FILEKIND, CREATIONDATE, RELEASEID, etc. When these files are transferred to a PC running Windows NT, all those attributes will be lost. By packaging the files and their attributes into standard, simple text files, the new files then can be transported across any open system (e.g., UNIX, NT). Upon reaching their destinations (which are other A Series systems), the text files are converted back to their native forms with all the right attributes. This is ideal for maintaining A Series data formats in a heterogeneous networking environment.

A digital signature is calculated for every file as it is being WRAPPED (packaged). This signature is calculated using the Disk File Header (DFH) and the data within the file, along with the Public/Private key pair. This will ensure that there is no intentional corruption of the Disk File Header (DFH) and the data as the file is shipped across a network. It will also provide the receiver of the file a certain measure of confidence as to the origin of the file. Additionally to the signature, there will be calculated a checksum for entire contents of the file, including the Disk File Header.

When a file is wrapped with a request for digital signature, its Disk File Header will have a checksum, its entire file will also have another checksum, and a digital signature will be calculated for the entire contents of the newly wrapped file. The functionality of wrapping files with digital signature is available through the WFL syntax as well as through programmatic interface.

As a result, the Unisys A Series systems will provide a programmatic interface to its Master Control Program (MCP) which will provide a mechanism for "wrapping" files with signature and for "unwrapping" signatured wrapped files.

When a wrapped file is unwrapped, the Unisys A-Series computer determines if a digital signature is present within the file. If so, it will attempt to authenticate the signature to ensure that the data has not been altered. Once the verification process completes successfully, the system permits the file to be re-created into its native form. The Work Flow Language (WFL) syntax will also be provided for this functionality.

Wrapping is a term which is used to define the process of packaging an A Series file, along with its Disk File Header information and a checksum and optionally a digital signature, as a byte-stream data file, so that it can be transported across heterogeneous networks and non-A Series specific media, while still maintaining its native A Series attributes.

Unwrapping is a term used to define the process of taking a previously "wrapped file" and coupling it with the information from its original Disk File Header (DFH) in order to restore the original native A Series file, as it existed prior to being wrapped.

Thus, the problem of a software and file format which is oriented to one specialized system can now be transformed in order to provide a format that is utilizable not just for a first system, but also for a first and second system, whereby the second system would not ordinarily be compatible with the first system. Thus, it is desirable to allow files (created on a Unisys ClearPath HMP/NX system or A-Series system) to be transformed so they can travel across a completely different system (such as NT) without loss of the file's original native characteristics.

The present disclosure involves the "Unwrap" operation, whereby there are provided methods giving the ability to restore files that were previously "signatured" and wrapped into text stream data files, and which were transported across an open network or were burned onto industry-standard Compact Disks for distribution.

This method and system for example, provides a Unisys A-Series computer User a measure of confidence when restoring wrapped files from a Compact Disk or from other communication means (for example, MS Mail, Internet, etc.). If the file's signatures are verified, their data are guaranteed from corruption.

SUMMARY OF INVENTION

A first platform having a specialized proprietary file protocol can have this file converted to an industry-standard byte stream data file in a second format usable by a second platform or placed on a CD-ROM.

Now, when the second standard format is used to communicate with the first platform, the file must be "unwrapped" and verified through a signature which was attached to the original wrapped file.

Thus, when original specialized and formatted native proprietary files have been signatured and converted to byte stream industry-standard data files to be burned on a Compact Disk or transported across an open network, it is often necessary to recapture the original files for use by the proprietary system and which has often been integrated with another system, and which may involve a Microsoft Windows NT, a UNIX or other platform in a network integrated with an A-Series system.

The present method and network allows a typical integrated system network, such as a Unisys A-Series and Microsoft NT system, to utilize the byte stream data files from a Compact Disk (or from the network) and programmatically transform the byte stream data files, after verifying their digital signatures, into their originally specified format and native attributes, usable by the A-Series platform.

The Work Flow Language of a Unisys A Series system utilizes an UNRAP command allowing the A Series Master Control Program to verify the signature with its MCP_FILEWRAPPER routine which then calls an MCP_WRAPPER routine to reconstitute the original native files for use by the original proprietary system and its specialized and formatted native files.

BRIEF DESCRIPTION OF THE DRAWINGS

FIG. 1A is a drawing of a system whereby wrapped files with signature are fed to a first platform (ClearPath) where they are unwrapped into native proprietary usable files by the first system, and verified by the accompanying signature;

FIG. 1B is a more detailed view of the system for the unwrapping and verifying of single wrapped files;

FIG. 2 is an illustration of the format for a wrapped data file having signature (R,S) as a byte stream data file;

GLOSSARY ITEMS

Figure 3A:
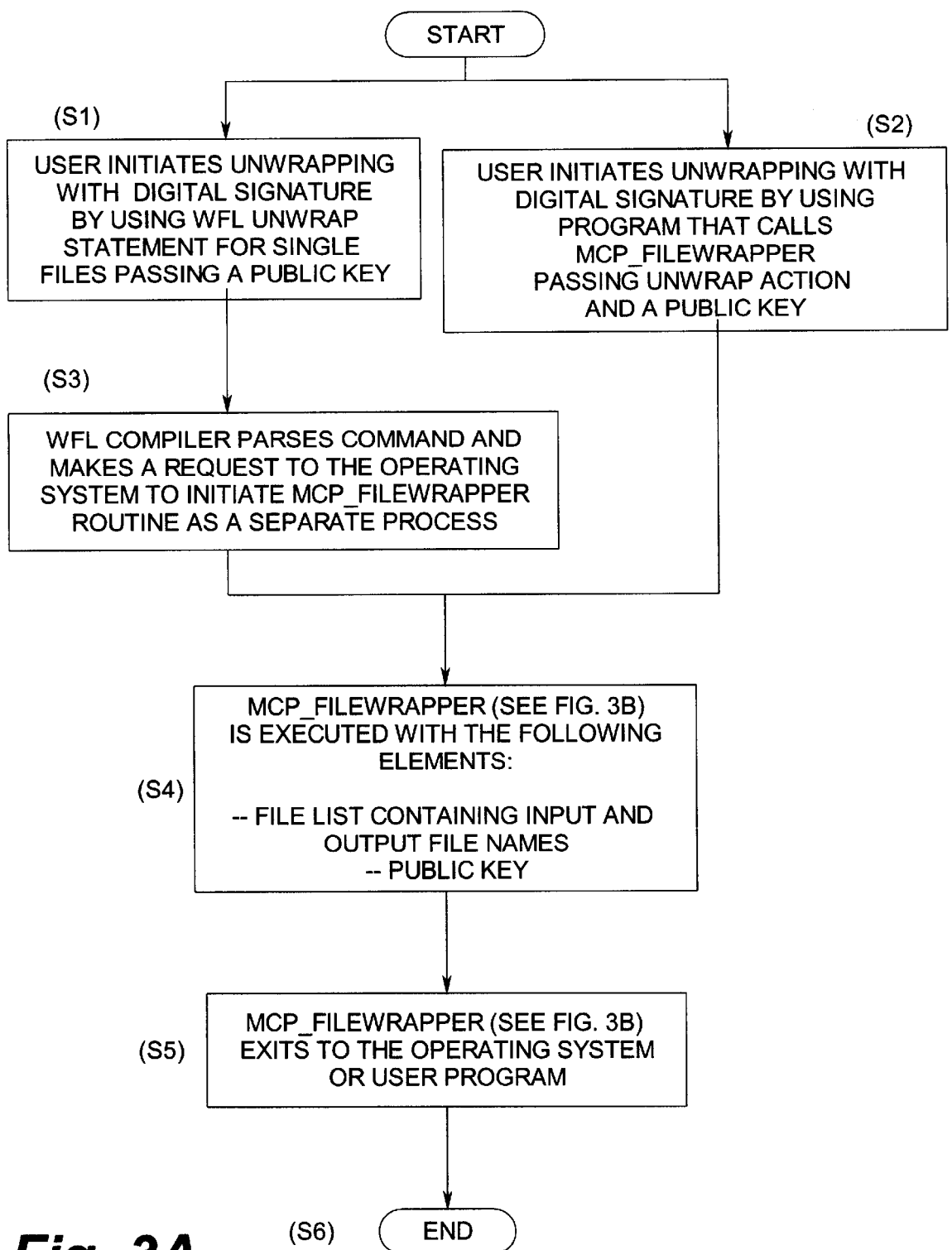
FIG. 3A is a flow chart showing the overall process of verifying and unwrapping single files.

1. A SERIES ATTRIBUTES: Native attributes that can be assigned to a file to allow the system to control how the file is accessed and used, and by whom (security privileges). There are somewhere on the order of 450 such attributes for Unisys A Series files.
2. A SERIES KEYS FILE: A native file, located on a individual system, that contains license key information used to control which features an individual system is allowed to use for some features. License keys need to be purchased by the user before the feature can be utilized on the individual system.
3. ATTRIBUTE INFORMATION OF A SERIES FILES: Specific attributes assigned to individual files stored in the file's Disk File Header (DFH) on Disk.
4. BYTE-STREAM FILE: A character oriented file with FILESTRUCTURE=STREAM, MAXRECSIZE=1, AND FRAMESIZE=8. This is a simple, non-executable, data file that can exist on any kind of system.
5. DATA CD-ROM: See ISO 9660 Format (Item 12 below). These CD's appear like disks on A Series systems. Multiple user access is allowed to these CDs.
6. DIGITAL SIGNATUTRE: A digital signature is a hash pattern created by applying an industry standard signaturing algorithm (similar to a checksum) to a file or data stream, along with a private key. This hash pattern travels with the file across a network and is used, along with a public key, in order to ensure the file has not been compromised (intentionally or otherwise) during the transfer process.
7. CONTAINER: A single byte-stream file consisting of one or more wrapped files, a simple directory of files stored in the container, and optionally a digital signature.
8. CREATIONDATE: An A Series (Unisys) file attribute, used to store the data and time a file was created.
9. FILEDATA—LFILE: An A Series (Unisys) program, or utility, used to interrogate attribute information of native A Series files.
10. FILEKIND: An A Series (Unisys) file attribute, used to identify the internal structure of the file being accessed (e.g. Algol symbol, Algol object code, character data, or system directory).
11. INTERIM CORRECTION PROCESS (ICP): The process used by Unisys computer systems to deliver software updates to released products held by customers.
12. ISO 9660 FORMAT (A.K.A. ISO STANDARD FORMAT, HIGH SIERRA FORMAT): A standard format used for directories and files on CD-ROM disks. The presentation for the information contained on these directories is at the operating system's discretion. On Unisys A Series systems, directories and files are viewed using the standard Cande "FILES" and ODT "PD" commands.
13. LIBRARY MAINTENANCE FORMAT: A Unisys proprietary format for tapes containing multiple files used primarily for archives, backup of restore, and transferring of files among A Series systems.

14. LIBMAINT CD-ROM: A specially formatted CD-ROM, created on an ISO 9660 Formatted CD-ROM, that contains an image of a Library Maintenance tape. This appears to an A Series system as if it were a Library Maintenance tape. Only one user is permitted access at a time, and only COPY (and COPY-related) syntax, and Filedata TDIR are allowed to act on this CD.

15. NATIVE A SERIES FILES: A file created on Unisys A Series systems or ClearPath HMP/NX systems specifically for use on that same class of systems.

16. NON A SERIES FILES: Files that were created on systems other than Unisys A Series or ClearPath HMP/NX systems.

17. NEW FORMAT FILE: the Byte-Stream data file that results from executing the WRAP process on an A Series file.

18. NT SOFTWARE—CD BURN PROCESS: Any standard "Off-the-shelf" package capable of burning images on to a Compact Disk (CD) that runs on a Microsoft NT system.

19. P, O, G: Primary numbers, stored in the system's digital signature keys file and used in the creation of public/private keys as well as both signing files and verifying the signatures of files, using the public and private keys.

20. PUBLIC & PRIVATE KEYS: Public and private key pairs are generated at the same time by a special utility. These key pairs are used to create a signature and then later check that signature to ensure that a file has not been compromised. These keys are generated together and must be used together to ensure the integrity of a file. Under normal operations, the private key is intended to be known only by the person or utility generating the hashed signature of the file. This key is meant to be restricted. The public key can be made available to any person or utility wishing to check the signature to ensure the integrity of the file once it has reached its destination.

21. PUBLIC/PRIVATE ENCRYPTION: A common methodology for encrypting files so they may be transported across an open network so as to use a public/private password encryption scheme. Typically, the two passwords are programmatically generated at the same time such that, they can be used in conjunction with each other. One password, the private one, will be used to encrypt the file. The other password, the public one, is; used by the recipient of the file to decode it. Typically, a smear pattern, or some clear text string, is added at the beginning of the file before the file is encrypted. When the file has been decoded using the public password, this smear pattern should match what was originally placed in the file. If the string does not match, it can be assumed that the integrity of the file has been compromised.

22. RELEASE ID: A Unisys A Series file attribute, used to store the specific release level that the software was created for.

23. SHARE: A Directory or disk that is made available to selected or all users across a network.

24. UNWRAP: The process of taking a previously wrapped file (or data stream) and coupling it with the information from its original Disk File Header, to re-create the original native A Series file as it existed prior to being wrapped.

25. WFL SYNTAX: Work flow language syntax, used to control job flow on a system.

26. WFL UNWRAP syntax: Specific work flow language syntax used to execute the unwrap process on a file, or files.

27. WRAP: The process of packaging an A Series file, along with its; Disk File Header information and a digital signature, as a data stream, or as a byte-stream data file (FILESTRUCTURE=STREAM, MAXRECSIZE=1, FRAMESIZE=8), so that it can be transported across heterogeneous networks and non-A Series specific media, while still maintaining its native A Series attributes.

28. INPUT FILE: The already existing file that is to be packaged into a byte-stream text file by the wrap process.

29. OUTPUT FILE: The resultant byte-stream text file created by "wrapping" the input file.

30. DSA: Digital Signature Algorithm—used to create a digital signature for a file or data stream. It should not bet confused with any data encryption algorithm since the data is not encrypted by any means.

31. DSA INFORMATION SET: This term is used loosely here. It is essentially the same as DSA Key Set, but without the system DSA public key.

32. DSA KEY SET: A set of DSA information which consists of {KeyID, SSR level, Prime P, Prime Q,G, system DSA public key} for a particular software level. Only one set is created for a software release.

33. DSA KEYSFILE: The system file that contains one or more DSA key sets. If the file is titled as *SYSTEM/DSAKEYSFILE and is stored on the halt/load pack, it is considered as the active system DSA keysfile.

34. SIGNATURING: The process of applying the Digital Signature Algorithm to a file while wrapping it into a WRAPPEDDATA or CONTAINERDATA file. The resulting file is sail to be digitally "signatured" or "signed".

35. SYSTEM DSA PRIVATE KEY: A DSA private key created for the sole purpose of signaturing Unisys-released software. It is kept secret by the Unisys Software Releases (and/or Support Group). Only one system private key exists per release. Its counterpart—the system public key—is stored in the system DSA keysfile.

36. SYSTEM DSA PUBLIC KEY: A DSA public key created for the sole purpose of verifying wrapped software signed by the Unisys Software Releases (and/or Support Group) using a corresponding system DSA private key. Only one system public key exists per release and is stored as part of a DSA key set in the system DSA keysfile.

37. VERIFYING: The process of validating the digital signature of a WRAPPEDDATA or CONTAINERDATA file before unwrapping it.

38. WRAPPED FILES: Files created as a result of the wrapping process—See Wrapping.

39. SL (SYSTEM LIBRARY): SL is a Unisys A-Series MCP systems operation used to declare that a codefile or program, is to be considered a "System Library" for execution purposes. It allows for other programs to access the functions in that library without knowing much of anything about the library itself. The operating system will have knowledge about where the library is located on the disk, and control over which programs are allowed to link to the library for the purpose of accessing its routines.

40. SIGNATURE SUPPORT LIBRARY: The Signature Support Library is the System Library function that exports routines that are used for signing and verifying files. When the MCP signs a container or a wrapped file, it makes a call to the SSL's procedure called DSASIGN. Similarly, when the MCP needs to verify a signed container or a signed wrapped file, it makes a call on the procedure DSAVERIFY. Both routines return a result that indicates if the operations were successful or not.

General Overview

A general overview of the system for receiving industry-standard byte stream text data files with their signature and converting these wrapped files into a verified data file which holds all the specialized attributes for a proprietary first system (14) is shown in FIG. 1A.

An operator terminal can initiate via Channel 101, the ClearPath and A-Series system 14 to access a (Wrapped\FILE\CD) 21 which resides on the Compact Disk 34 and utilizing a Compact Disk Drive 33 and past the wrapped file to the MCP_FILEWRAPPER Routine 36 which will convert the wrapped file 21 into a specialized proprietary unwrapped file for placement on Disk 20 (MYPACK), which :now holds the unwrapped file 21d (UNWRAPPED/FILE/CD).

The first platform designated as the ClearPath A-Series system 14 holds the MCP_FILEWRAPPER Routine 36 which provides the process for unwrapping a wrapped file, and also passing through the signatured data.

Referring again to FIG. 1A, the first platform 14 is connected through the NX services 50 to a second platform 30, which here is designated as the Microsoft NT system. The second platform 30 has provision for Internet or e-mail software, (30y) and also a program designated Windows Explorer, 30x.

The second platform NT system 30, could also be designated alternatively as a UNIX system, in which case the NX services 50 shown in FIG. 1A would not be required, and the Microsoft Explorer program 30x would be replaced by the industry-wide standard File Transfer Protocol (FTP).

Further in regard to FIG. 1A, wrapped files of an industry-standard byte stream data format may be sourced from the open network 40 or from another source such as from item 22 (WRAPPED\FILE\NET).

The byte stream text data file from the open network would be passed through the second platform NT system 30 and dragged and dropped by the Windows Explorer 30x onto the Disk 24 (DISK C). This wrapped data would then be passed on line 24t over to the MCP_FILEWRAPPER Routine 36, which would then process it and unwrap this file after verifying its signature and place the resultant file 22d onto Disk 20 (MYPACK).

Likewise, any other source of wrapped files, such as from item 22, would then be transferred to Disk 24 (DISK C) and passed by line 24t over to the first platform 14 through which it would then be unwrapped and placed onto Disk 20 (MYPACK), where it would reside as UNWRAPPED/FILE/NET, 22d.

The operation of the second platform 30, which receives the wrappers file over the open network 40, would be initiated over line Channel 103 from the operator terminal 8.

Subsequently hereinunder, FIG. 1B will describe the operating system and modules in greater detail to illustrate the verification and unwrapping of single wrapped files.

DESCRIPTION OF PREFERRED EMBODIMENT

Referring to FIG. 1B, there is seen a diagram of the major elements involved for verifying and unwrapping single wrapped files.

A first platform designated ClearPath HMP/NX 14 represents a Unisys A-Series computer Operating System 14, which has a Central Processing unit 12, a Main Memory 18, a Microcode Memory 16, which is managed by the MCP 10 (or Master Control Program). The CPU 12 is also supported by a storage media 20. Disk 20 (MYPACK), which carries the resultant unwrapped files after the conclusion of the unwrapping operation. These unwrapped files on Disk 20 are now suitable for use and operation by the first platform 14 even though the originally received data was wrapped data which came from various sources, such as an open Network 40, or a CD-ROM 34. The data files on Disk 20, under the present system, have been verified as a result of the signaturing operation which was concurrently used to validate or verify the data files.

The first platform 14 is also seen to have a Work Flow Language compiler 15 (WFL), and a Signature Support Library 13.

Now in the sense of integrating to other platforms, there is seen a second system called the NT System 30 (which alternatively could be a UNIX, an IBM, or other system), which is a platform developed by the Microsoft Corporation, of Redland, Wash. The NT System 30 (second platform) is seen having a storage medium 24 (DISK C), which can receive a wrapped file from a network, as designated by the file 22 (WRAPPED\FILE\NET).

Further, this system of FIG. 1B shows that a file can be received from an open network 40 and passed on to the second platform 30 as a wrapped file, designated WRAPPED\FILE\NET.

The DISK C24, which can hold a wrapped file, is seen connected to the Windows Explorer 30x, and also to the MCP 10. The NX services function 50 works for the inter-cooperation between the first platform Master Control Program and the second platform Windows Explorer 30x.

In FIG. 1B, the WFL compiler 15 is seen connected to the MCP_FILEWRAPPER 36 by transmitting a wrapped file which may be sourced from either a Compact Disk CD (WRAPPED\FILE\CD), or from the Network (WRAPPED\FILE\NET).

The MCP_FILEWRAPPER Routine 36 is seen to have a routine 36x which is designated COPY_FROM_CD and another routine designated Signature_Verified 36y. The routine 36y can utilize a connection to the Signature Support Library 13y calling the DSAverify Routine (Digital Signature Algorithm Verify). Thus the MCP_WRAPPER routines 36 calls Signature Verified 36y to verify the digital signature of a signed wrapped file before calling MCPWRAPPER 38 to unwrap the file for placement on MYPACK 20.

Thus, the A-Series ClearPath System 14 is provided with a Work Flow Language WFL Compiler 15, which is an interpretative language capable of taking User instructions and translating them into Operating System (OS) procedure calls. The MCP 10 has a relationship to the MCP System 30 through use of a MX Series Unit 50.

NX Services is a software unit used to integrate MCP operations with the NT Platform operations through use of a Microsoft (MS) Standard RPC (Remote Procedure Call) interface. The WFL Compiler 15 is an interpretative compiler which provides a new language syntax using the word WRAP or UNWRAP.

The Operator Terminal 8 of FIG. 1B, is the operator interface in which an operator would enter a command which would unwrap a wrapped file, such as the wrapped file on Compact Disk 34, which holds the WRAPPED\FILE\CD, 21. This wrapped file on Compact Disk 34 can be accessed by the Compact Disk drive and fed through the Master Control Program which utilizes the MCP_FILEWRAPPER Routine 36, the MCP_WRAPPER Routine 38, and the Signature_Verified program 36y, in order to put the unwrapped file data on to Disk 20 (MYPACK), where it would reside as the item 21d (UNWRAPPED/FILE/CD).

The present discussion indicated how a wrapped file on a Compact Disk 34 was verified and then unwrapped in order to be placed on the Disk 20 to provide a resultant file 21d.

Another facility of the present verification and unwrap system involves the use of the second platform, which is the NT System 30. A wrapped file can be sourced from an Open Network 40, or from another file source 22 (WRAPPED/FILE/NET). This wrapped file 22 can be fed directly onto the Disk 24 (DISK C), or the Open Network 40 can transmit the wrapped file to the second platform 30 via its Internet or e-mail software 30y, which will use the Windows Explorer 30x to put the wrapped file onto Disk 24 (DISK C).

Then as a result of the User-operator commanding through Channel 103 to the second platform 30, the wrapped file data from DISK C,24, will be passed on to the MCP 10 which will use the WFL Compiler 15 to send the wrapped file to the MCP_FILEWRAPPER Routine 36, which will then verify the signature of the wrapped file through the routine Signature_Verified 36y before utilizing the MCP_WRAPPER Routine 38 in order to unwrap the file, after which the unwrapped file, (whether from the CD or from the Internet), will be placed on Disk 20 (MYPACK) where it can reside as file 22d (from the Network) or as file 21d unwrapped from the Compact Disk.

Thus, what has been accomplished is to take a single signatured wrapped file from either industry-standard CD-ROM, or from an open network, and restore it back to its original native A Series file after verifying its embedded signature.

Accordingly, the present system operates such that operators using the first platform (A-Series systems), can unwrap their files directly from an industry-compatibles Compact Disk, or from a byte stream of data over the Internet, so that the file is now usable, by merely giving it the command to unwrap the files.

The "digital signature" is created using an industry-standard public key/private key signaturing algorithm which provides a measure of security in that it allows a user confidence as to where the file originated from. The present system encompasses the Master Control Program (MCP), the Work Flow Language (WFL) program, and the FILEDATA work necessary to wrap files by packaging them into new, byte-stream files (wrapping) and later restoring them (unwrap) to their original native A Series format when needed for A Series systems (Unwrapping).

New WFL Syntax

This involves a new work flow language syntax, so that arrangements are made in the WFL compiler 15 to support the new syntax which will have some similarity to a previous Library Maintenance MOVE command. The new syntax allows a User to wrap either a single file, a list of files, or a directory of files, in addition to subsequently enabling the unwrapping of these files, by specifying both the input file and the output file, or the directory title and location.

Added Programmatic Interfaces

A first programmatic interface 36 (MCP_FILEWRAPPER) works with a second programmatic interface 38 (MCP_WRAPPER) to execute the wrap and unwrap operations. A programmatic interface for the wrap operation is provided that will allow the User-Caller to pass a native A Series file's title and location as "input" along with an "output" file, title and location. The "output" file will be a "byte-stream" file with a beginning data block containing (i) an identification string; (ii) the original files Disk File Header information; (iii) the file itself as byte-stream data; and (iv) an ending block containing a checksum, and optionally a digital signature.

Then, this added programmatic interface allows the caller to pairs the byte-stream file's title and location as input, along with an output file title and location if needed, for use of the "unwrapping" process. The "resultant file" will be a native A Series file created with the output file and location, but also containing the data and all of the native A Series attributes of the original file.

Second Programmatic Interface

This interface (MCP_WRAPPER) is created to allow a caller to pass the A Series file's title and location as "input", together with an "output" procedure. The data returned to the caller's output procedure will be a stream of data with (i) a beginning data block containing an identification string; (ii) the original file's Disk File Header information; (iii) the file itself as byte-stream data; and (iv) an ending block containing a checksum or a digital signature.

Functionally, the second programmatic interface (MCP_WRAPPER) will also allow the caller to pass an input procedure, along with the title and location of an output file. The data passed to the input procedure here would consist of a stream, of data, with a beginning data block containing the identification string, the original file's Disk File Header (DFH) information, the file itself as "byte-stream data", and also an ending block containing the checksum or the digital signature, which is basically the same information that was passed to the output procedure when the file was originally wrapped. Here, the "resultant file" will be a native A Series file created with the output file title and location, but containing the data and all of the native A Series attributes of the original file.

New FILEDATA Syntax

New syntax has been added to the FILEDATA LFILEs command in order to specify that the file being interrogated is a WRAPPEDDATA file. If this is a WRAPPEDDATA file, then FILEDATA will report the "attributes" of the native A Series file contained within the wrapped data file, rather than the attributes of the "wrapped" data file itself.

WFL Wrap Command

This is the Work Flow Language wrap command usable in a first system platform such as the Unisys A Series computer system which can be executed to initiate the action of taking specialized formatted native A Series files and turning them into byte-stream files which can later be burned onto CD-ROM disks. Thus, the software files of a first computer platform, such as the Unisys A Series system, can now be made able to co-exist on the same data CD-ROM's as other types of software which is neat A Series software.

KEYSFILES

The system will provide the use of A Series KEYSFILE which will also be wrapped using the new WFL syntax. This resulting file will also be burned onto the CD-ROM. Normally, the Unisys A Series KEYSFILES are shipped on separate tapes from the rest of the software releases, so that in the present situation, the newly wrapped KEYSFILE will be shipped on a separate data CD-ROM separate from the rest of the A Series release software files.

The A Series KEYSFILE is a file on each A Series system used to store License Key information for the individual system in order to determine which of the Unisys licensed features the user has purchased for use on that system.

The new WFL UNWRAP syntax can be used to unwrap the KEYSFILE off of the CD, while copying it into the A Series system. Once the file (as KEYSFILE) has been copied onto the A series system, then a IK MERGE can be performed. IK MERGE is the system command used to merge the data from the new KEYSFILE (unwrapped from the CD ROM on to Disk) on the A Series system into the system's current KEYSFILE.

Digital Signature Algorithm

The acronym DSA refers to the digital signal algorithm (DSA). The DSA public and private key are a function of a large prime numbers designated P,Q,G, which are generated by the digital signature algorithm. When "signing" a given file, the DSA requires the values of P,Q,G, and their private key to produce a "digital signature" which consists of two large integers designated R and S. When this message is to be verified, the verification process asks for a set of data designated [P,Q,G, PUBLICKEY, R, S].

A user is only concerned with the public and the private key pair. However, since prime numbers P,Q,G,R,S, are inherent and required in the creation and verification of a "digital signature", there must be provided a way to manage them and make their presence essentially transparent to the user. R and S are easy to handle because their are created during the "signing" process of a WRAP operation, so that their values are readily available to be embedded in the WRAPPED file. The handling of elements P,Q,G, on the other hand, is more complex because their values must be supplied from an "external source", (that is to say, the User), to the WRAPPING function.

Thus questions and decisions arise regarding (i) how should P,Q,G, be generated? (ii) Since the generation process consumes so much resources, how often should P,Q,G, be generated, that is to say, should it be on a per-run basis,, on a per-user basis, or otherwise? (iii) Since each binary value occupies an array of 11 words, how would a user handle such large values, since the manual typing of these values would be unnecessarily time-consuming? (iv) Then, what kind of user interface should be provided to accommodate the P,Q,G, public key and private keys? How would they be handled by the Work Flow Language statements of WRAP and UNWRAP? (v) Should the items P,Q,G, be embedded within the WRAPPED FILES? And if so, would that compromise the security of the file, if the file is intercepted when it is transferred across an open network?

The solution to these types of problems and questions will be delineated in the following paragraphs.

Overall Process

For each software Release made, a special Release group will run a special utility that generates the values for P,Q,G, public and private keys. This particular set [ID, software level, public key, P,Q,G] will be stored by the utility as a record of the new KEYSFILE called *SYSTEM/DSAKEYSFILE.

The Release group will use the system "private key" during the WRAP process to "sign" all the required system software files for that particular level.

The DSA (Digital Signature Algorithm) KEYSFILE will be distributed to customers in the same manner as the existing SYSTEM/KEYSFILE. Upon receiving the DSAKEYSFILE and the system software, the customer installs the KEYSFILE into the system and starts UNWRAPPING WRAPPED software without the need for specifying the system public key.

When a user wants to WRAP his files with the "digital signature option", he must obtain a DSA keypair. Keypairs can be generated by writing a program that calls the MCP, MCP_GENERATEDSAKEYS procedure.

The private key would then be supplied to the WRAPPING routine (for example, through the TASKSTRING attribute of the WFL_WRAP statement). The public key would be given to the receiver of the files. When these files are to be UNWRAPPED, a correct public key must be provided (for example, via the TASKSTRING attributes of the WFL UNWRAP statement) for the operation to succeed.

Handling DSA Value during Wrap and Unwrap

The WRAPPING routine, upon recognizing that a digital signature is required, obtains the P,Q,G, values from the active DSAKEYSFILE for the System Software Release (SSR) level that the system is currently running on. It then providers these values, along with the user-furnished private key, to the DSA "signing routine". This routine, after signaturing the file, returns two large integers, R and S. These two integers, along with the current SSR level, can be stored within the file by the WRAPPING process.

When this file is UNWRAPPED, the UNWRAPPING routine gets P,Q,G, values from the active DSAKEYSFILE based on the SSR level it extracts from the file. The file's R and S values, along with P,Q,G, and the user-supplied public key, are then passed to the DSA signature verification routine. If there is no user-supplied public key (as is often the case of System Software WRAPPED by the Release group), then the system public key from the active DSAKEYSFILE is used.

Checksum

A checksum is calculated for the Disk File Header (DFH) for every file as it is wrapped. This ensures that there is no unintentional corruption of the Disk File Header as the file is shipped across a network. It also provides the receiver of the file some measure of confidence as to the, origin of the file.

In addition to the checksum for the Disk File Header, a checksum is also calculated for the entire context of the file including the Disk File Header (DFH).

Signature and Checksum (Prevention of Corruption)

The checksum will not normally be sufficient to ensure that a Disk File Header has not been intentionally corrupted, since the checksum algorithm is not protected and is fairly easy to reproduce. There is significant overhead to validate the Disk File Header if there were no protection of the structure, other than the simple checksum. Thus, without any real protection for the Disk File Header, it would be necessary to create an entirely new Disk File Header for the original file, and then separately validate every attribute of the header before it could be considered trustworthy for application.

The Master Control Program (MCP) 10, FIG. 1B, will assume that a Disk File Header is a valid piece of data. However, it is necessary to validate the Disk File Header before the rest of the file has even been retrieved, since even the information regarding the "size" of the file is stored in the Disk File Header. In order to insure that there was no intentional corruption while the file was in transit and also provide the "receiver" of the file with some assurance that the sender of the file was indeed that who the receiver expected it to be, a digital signature may be requested when the file is wrapped by specifying a private key with which to identify the signature file while wrapping. The receiver "must" specify the file's public key in order to verify the file when unwrapping it.

Public/Private Keys for Signaturing

A KEYS generation utility is provide(d as a separate utility to generate public/private key pairs to be used when signing files. Public/Private key pairs are generated using the new utility in order to be used by the wrapping interfaces for signaturing files. Users who wish to create their own utility can write a program to interface with the MCP procedure MCP_GENERATEDSAKEYS.

WRAPPEDDATA File Format

With reference to FIG. 2, there will be seen the format of the WRAPPEDDATA FILE which will be a simple bytestream file. This file, as seen in FIG. 3, will contain several sections. The first section (i) is the word UNISYS "0000101" which will be "EBCDIC" data used to indicate that this is likely to be a Wrapped file. The number associated with this identifier may be changed if the format of this file is changed.

The second block (ii) labeled "options" contains the options used when wrapping the file, such as the identifier to be used to locate the "public key" information in order to verify a file containing a digital signature.

The third block of FIG. 3 is (iii) designated as the Disk File Header, which involves a copy of the actual A Series Disk File Header for the file. This will become the actual Disk File Header for the file when it is restored to its native format after a "unwrap" operation. Additionally in block (iii), there is seen the Header checksum, which is a separate checksum for the Disk File Header itself.

The fourth block (iv) of FIG. 3 indicates "the file" which involves the contents of the file itself, written as byte-stream data.

The fifth block (v) of FIG. 3, is designated as "checksum", which will be a single word of 48 bits calculated for this file and the Disk File Header combined, using a private key from a public/private key pair.

The sixth section (vi) shows the digital signature as being composed of Section R and Section S. The Section R includes 11 words or a total of 528 bits. Likewise, the Section S includes 11 words of a total of 528 bits. This constitutes the digital signature portion of the transmitted file which has been wrapped.

DSAKEYSFILE File Format

The new system involves a keys file called "SYSTEM/DSAKEYSFILE". This file is stored and managed similarly to the manner of existence on earlier A Series systems which used the "SYSTEM/KEYSFILE". This file is used to store records of ID, software level, public key, PQG. These involve the following:

(i) ID: This is a unique and meaningful EBCDIC string with a length of up to 17 characters which is used for external display and for identifying the set.

(ii) Software Level: This is a real number that identifies the software level involved.

(iii) Public Key: This is a DSA key generated along with a private key based on certain prime numbers designated P, Q, G. This key is subsequently used in the "Unwrap" process of the A Series software.

(iv) P,O,G: These are prime numbers generated by a special Utility. For a given set of (P,Q,G), there are a variety of public and private key pairs which can be generated.

The DSAKEYSFILE is an unblocked file which consists of records whose maximum record size is 60 words in length. The general information record contains miscellaneous data about the file, for example, version, number of search table records, number of key entries, etc. This record is then followed by one or more search table records which in turn, contain a number of four word search entries. Following the search table records are the data records with each containing a different set of [ID, software, public key, P,Q,G].

The main purpose of the DSAKEYSFILE is to store the P,Q,G primes used when creating public and private key pairs. It is also used to store frequently used system public keys which are normally about 60 characters long, so the caller of Unwrap does not need to enter this character string every time an Unwrap process is requested on a Unisys signatured file.

This procedure involves a further procedure entitled "GET_DSA_PQGKEY" which obtains the corresponding set of [P,Q,G, system public key] from the active DSAKEY-SFILE and this will involve the procedure entitled "GET_DSA_PQGKEY" which is used to obtain the set of public keys from the DSAKEYSFILE and return the set to the caller.

Interface Operation

The present system involves new work flow language (WFL commands) designated as WRAP and UNWRAP which are provided to allow Users a simple method of invoking the new interfaces of this system.

There area two new FILEKIND values created to identify the files of the new format. These will help to prevent users from accidentally using the WRAP syntax to act on a file that has already previously been wrapped.

There is basically now provided two new programmatic interfaces designated as (i) MCP_FILEWRAPPER and also (ii) MCP_WRAPPER. These programmatic interfaces are exported out of the Master Control Program (MCP) 10.

FILEKIND

This involves a set of values which will aid in identifying files that have been wrapped as long as the files have never left the environment of the first computer system, that is to say, the A Series computer. Once the file has then been copied into a non-A Series system, and then back on to the A Series system, this information is lost. The main purpose of new FILEKIND value is to ensure that a user does not accidentally attempt to WRAP an already WRAPPED file, as would be the case if a WFL WRAP command was executed on a directory of files and then the system did a Halt/Load before all of the files of a directory were wrapped. If the Job were to restart after the Halt/Load, the WRAP command would begin to act on the directory over from the very beginning. If a file is encountered with a FILEKIND or with a WRAPPEDDATA value, that file will be skipped, and an error message will be issued for the file indicating that the file had already been previously wrapped.

WORK FLOW LANGUAGE (WFL)

The Work Flow Language syntax is provided to allow a user easy access to the new programmatic interfaces. The new WFL commands permit the user to access the new interfaces to institute a wrap or an unwrap action without having to know the layout of the interfaces or having to create a program to call up these interfaces.

TASKSTRING

This is a data structure that contains private or public key information for either signaturing or for verifying the signature of the file. Thus, for an "Unwrap" operation, the TASKSTRING will be used to specify the public key that should be used to verify the signature that was calculated when the file was wrapped. Then conversely, for the WRAP operation, the TASKSTRING is used to specify the "private key" that should be used to calculate the signature of the file.

MCP Filewrapper Interface

The newly developed MCP_FILEWRAPPER program is used for Work Flow Language support and User programs. A User can call this program specifying either a "Wrap" or an "Unwrap" action along with the title and the location of both the input files and the output files. Of course, the input file specified for a "Wrap" operation must not have a FILEKIND of WRAPPEDDATA. Further, the caller must have the proper privilege for both, the input and the output files or directories.

The MCP_FILEWRAPPER program involves procedures which return errors. These errors are returned as display messages if the procedure is called from the Work Flow Language (WFL).

MCP Wrapper Interface

When this interface program is called to "Wrap" a file, it takes a standard form name for an existing A Series file, along with an output, or Write, procedure. The A Series files Disk File Header (DFH) will be checksum passed the output procedure as data along with the checksum. Then the file itself will be read and passed on to the output procedure as data. Finally, there will be provided (optionally) a calculated digital signature or a checksum for the entire file which will be passed to the, output procedure as data.

When the MCP_WRAPPER program copies a file from disk (i.e. "Wraps" the file), it updates the files COPY SOURCE time-stamp in the Disk File Header (DFH) of the A Series file that has been wrapped.

One of the parameters for the MCP_WRAPPER is the procedure designated IOWRAP. IOWRAP is the procedure being passed, either as an output or a WRITE procedure for Wrap or an input or READ procedure for the Unwrap. The parameters for IOWRAP involve (i) LGTH which indicates the length array data in bytes; (ii) DATA is the array containing the data to be written when for wrapping or READ for unwrapping.

It is significant to note that a Disk File Header (DFH) can involve data up to about 20,000 words long. Thus, the IOWRAP parameter procedure must be able to handle at least 20,000 words in the data array in one call.

The basic sequence for unwrapping a wrapped file has been described in the co-pending application U.S. Ser. No. 08/989,738 entitled "System and Method for Unwrapping a Single File from a Compact Disk for Utilization by Various Computer Platforms" and which is incorporated herein by reference.

The DSA Utility

The Digital Signal Algorithm (DSA) utility has a symbol file designated SYMBOL/DSATOOLS. When compiling this symbol file with the compiler option set at "INTERNAL", a non-restricted version of the utility is produced, otherwise, a restricted version of the utility is produced. This latter version only provides the capability to generate DSA public/private key pairs from a DSAKEYSFILE and is intended for general use.

The symbol file for the DSA utility provides certain functionalities which include:

(i) the ability to generate key pairs from a sequential file containing sets of DSA information.

(ii) the ability to create or to add DSA key sets to a DSAKEYSFILE.

(iii) the ability to delete DSA key sets from a DSAKEYSFILE.

(iv) the ability to dump contents of a DSAKEYSFILE into a "sequential file" (regular text file).

(v) the ability to merge a DSAKEYSFILE into the active *SYSTEM/DSAKEYSFILE.

(vi) the ability to copy certain DSA key sets from one DSAKEYSFILE and store them into another KEYSFILE.

Both of the above versions of the code file must be executed under a "privileged" User code.

The restricted version of the DSA utility is designated "OBJECT/DSATOOLS".

A non-restricted version of the DSA utility is designated "OBJECT/DSATOOLS/FULL".

A sequential file containing sets of DSA information is designated, DSAINFO/SOURCE. Currently, this file contains 21 sets of DSA information used to generate system public and private key pairs. Only one set is used per each software release, so that these can last for a considerable period of time.

Overall Process

For each Software Release (SSR=System Software Release), the software origination group will do the following steps:

1. Create a DSAKEYSFILE containing a DSA key set for that release, including a system DSA public/private key pair. The DSA public key is part of the DSA key set. The DSA private key is kept on a secret basis.

2. Using the generated DSA private key, the software origination group will sign Unisys system software. This, however, can be omitted if software is burned into Compact Disks (CD's), since the software on a Compact Disk cannot be tampered with.

3. Distribute the signatured software and the related DSAKEYSFILE to users and customers.

Generating a System DSA Key Pair and Creating a DSAKEYSILE

Using a privileged user code, one can execute the following steps:

1. Create a sequential file (for example, DSAINFO442) with at least one of the DSA information sets in the file DSAINFO/SOURCE. Each DSA information set is intended to be used in any one particular Software Release, and the same set should not be used more than once.

Figure 5:
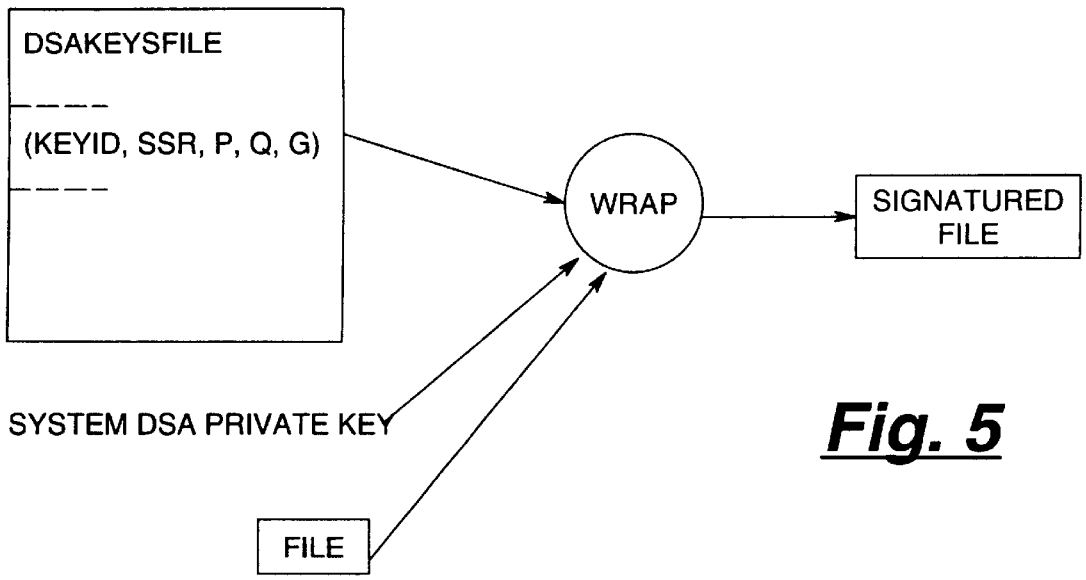
FIG. 5 is a diagram for Wrapping and Signaturing a file.
Figure 6:
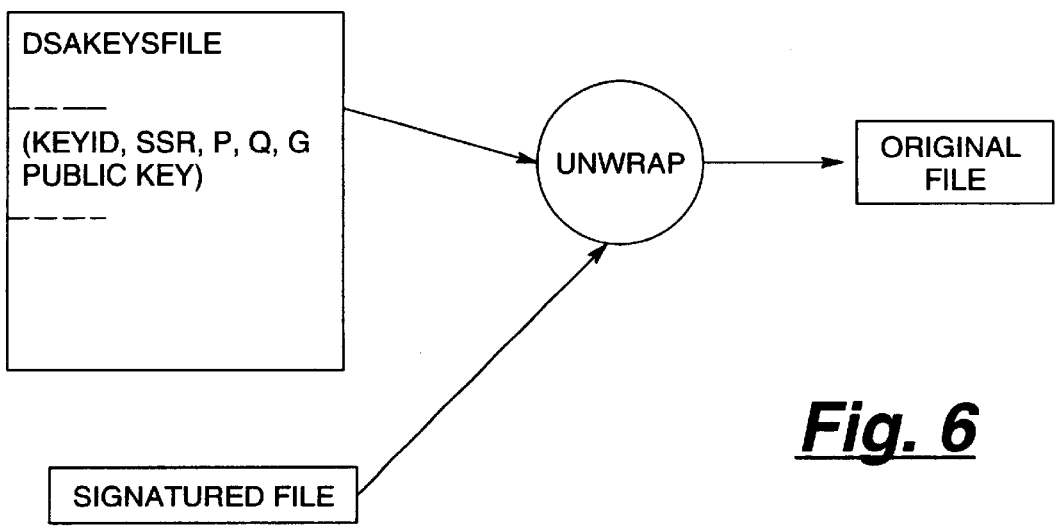
FIG. 6 is a diagram showing the unwrap and verification of a file.

For example, in a Command and Edit (CANDE) session, insert the following commands:
MAKE DSAINFO/442SEQ
U ED
 ]INSERT DSAINFO/SOURCE from line- to line
  <editKEYID name if necessary, for example, SSR442DSAKEYID>
  <edit SSR number, if necessary, for example, 442.>
 ]END
SAVE FIG. 5 is a diagram illustrating how the digital signature algorithm information, together with the key ID is inserted into the DSATOOLS, which feeds one Output to the DSAKEYSFILE, and another output to the DSAKEYS/442. This results in the creation of the DSAKEYSFILE, having a public key and a DSAKEYS/442 unit which combines the public key and the private key.

SIGNATURING SYSTEM SOFTWARE USING DSA PRIVATE KEY

1. Assuming that the system is running on a System Software Release designated 44.2, the method is now ready to signature the files. If the system is not ready to signature the files, it is necessary to go back to step 1, in the previous section and create a DSA key set in the *SYSTEM/DSAKEYSFILE for the particular level the system is running on.

2. It is necessary to ensure that SIGNATURESUPPORT is SL-ed. If this is not the case, then SL it with *SYSTEM/DIGITAL/SIGNATURE/SUPPORT. SL is defined in item 39 of the Glossary (System Library 13 ).

For example, at the Operating Display Terminal (ODT), enter the following:
SL SIGNATURESUPPORT=*SYSTEM/DIGITAL/SIGNATURE/SUPPORT 3. Ensure that DIGESTSUPPORT is SL-ed. If this is not the case, then SL it with:
*SYSTEM/MESSAGE/DIGEST/SUPPORT For example, at the Operator Display Terminal, enter the following:
SL DIGESTSUPPORT=*SYSTEM/MESSAGE/DIGEST/SUPPORT 4. Now, operate to signature the software by using the system DSA private key. Files can be wrapped as separately Wrapped files, or as Containers. The latter, (Containers), allows a number of Wrapped files to be grouped into one single entity. For the software that is to be burned into a Compact Disk (CD), there is no need to signature them since they cannot be altered after they are put into a Compact Disk.

EXAMPLE

Using the WFL WRAP syntax, to pass the system DSA private key in the task attribute TASKSTRING, a Work Flow Language (WFL) job can then be created to automate the wrapping process.

In a Command and Edit (CANDE) session, do the following:

WFL WRAP AFILE AS WRAPPED/AFILE;TASKSTRING=<system DSA private key>

WFL WRAP ADIR/=INTO CONTAINERA; TASKSTRING=<system DSA private keys>

It should be noted that the files can also be wrapped and signatured using a programmatic interface to the MCP-exported entry point MCP_FILEWRAPPER.

Wrap and Signature File

FIG. 5 is an illustration of wrapping and Signaturing a file. Here, it is seen that the wrapping sequence receives information from the DSAKEYSFILE. It also receives an input from the system DSA private key, in addition to receiving the file information, after which the wrapping sequence will produce the signatured file.

5. To make sure that wrapped files are signatured correctly, it is desirable to verify these files before shipping them out to customers over the Internet, or via the CD-ROM.

Examples Utilizing the Unwrapped Sequence for System Software that was Signed with a System DSA Private Key Use the WFL UNWRAP syntax, but do not pass any string in the TASKSTRING attribute. The system will pick-up the corresponding system DSA public key in the file *SYSTEM/DSAKEYSFILE for verification. This step can also be incorporated into the same Work Flow Language (WFL) job that also WRAPS files.

WFL UNWRAP WRAPPED/AFILE AS UNWRAPPED/AFILE

WFL UNWRAP*=AS UNWRAPPED/=OUTOF CONTAINERA

As seen in FIG. 7, the unwrap sequence is fed information from the DSAKEYSFILE, and also fed by the signatured FILE in order to then produce the original native file which is compatible for the original computer system which uses the Master Control Program, Distribution The distribution of the signatured files and the DSAKEYSFILE is done using the ordinary procedures for shipment which an be done via Internet transfer or by CD-ROM.

Using Digital Signatures with Wrapped Files

With the advent of the WRAP/UNWRAP feature, the present system also gives users the ability to optionally sign wrapped files with digital signatures. Like a normal signature on a real piece of paper, a digital signature allows this recipient of a singed wrapped file to be certain of its origin. Unlike a normal signature, the digital signature is electronically represented as binary data rather than handwritten characters. This allows the signature to be embedded within the file, and it enables the system to do some special calculations in order to authenticate the signature and verify that the file has not been tampered or altered during its transmission.

Digital signature "creation" is based on the data within a file and a private key. Similarly, digital signature "authentication" is based on the same data of the file and a corresponding public key. The private key and public key are generated as a pair by the system, so even though they are not the same, they still share some underlying common mathematical properties. By differentiating the public key and the private key of a key pair, one cannot use either key for both signing and verification. Thus, a person possessing only a "public key", though is capable of "authenticating" a wrapped file's digital signature "created" by a corresponding "private key", but cannot use it to produce the same signature. On the other hand, a person with only the private key will not be able to verify the signed wrapped file.

The digital signature algorithm (DSA) also ensures that a public key belonging to one key pair cannot be used to validate the digital signature derived from a private key of another key pair.

Since the DSA is not an encryption algorithm, signing a wrapped file does not scramble its data. Instead the DSA makes a pass through the data stream and applies the specified private key to come up with a checksum-like binary hash pattern which is then inserted into the resulting file.

When creating a wrapped file with digital signature, the originator should perform the following steps:

Obtain a DSA key pair that consists of a public key and a private key

Specify the private key in the wrapping process to create a digitally signed wrapped file Send the signed wrapped file to its intended recipient Send the public key to the same recipient The last two steps should get executed separately to make the file more secure. If both the signed wrapped file and the public key are transmitted in the same messages, it may be possible for some unauthorized party to intercept the message, unwrap and modify the file, then sign it with their own private key, and forward, to the unsuspecting recipient, the altered signed wrapped file and a different public key.

Upon receiving a signed wrapped file or container, the recipient of the file should perform the following steps:

Obtain the corresponding public key

Specify the public key in the unwrapping process. If the system does not attempt to authenticate the file's digital signature or fails to do so, the signed wrapped file is either corrupted or was modified and should not be trusted.

The following sections describe in detail what a customer should do to unwrap the signed wrapped files, and how one can wrap and unwrap one's own files with digital signatures.

Getting Started

New System Libraries

There are two new System Library files that need to be installed and SL'ed (Support Library—Item 40, Glossary) on the system before one can utilize the digital signature feature. These are SYSTEM/DIGITAL/SIGNATURE/SUPPORT and SYSTEM/MESSAGE/DIGEST/SUPPORT. These files are shipped with software releases beginning with HMP NX3.0/SSR44.2. If these files are not currently available on the system, they may be obtained by ordering the SECURITY Interim Correction (IC) for releases beginning with SSR 42.3. From the ODT (Operator Display Terminal), install these files as follows:

SL SIGNATURESUPPORT=*SYSTEM/DIGITAL/
SIGNATURE/SUPPORT

SL DIGESTSUPPORT=*SYSTEM/MESSAGE/
DIGEST/SUPPORT

New DSA Keysfile

A customer also needs to obtain a copy of the SYSTEM/ DSAKEYSFILE. This keysfile contains one or more DSA information "sets" where each corresponds to a particular SSR (System Software Release). One can only wrap and unwrap files with digital signatures for the levels indicated in the DSA keysfile. If the *SYSTEM/DSAKEYSFILE already exists on the Halt/Load family, the available levels can be shown by entering the ODT (Operator Display Terminal) command: IK DSASHOW Beginning with HMP NX4.0/SSR45.1, the DSA keysfile is shipped with standard software releases. For earlier releases, a customer needs to call the support organization to obtain a copy of this file. This file will be delivered through the same process as *SYSTEM/KEYSFILE because wrapping the DSA keysfile could compromise Unisys' digital signature security mechanism.

The DSA keysfile is cumulative, that is—a DSA keysfile of a later SSR release will contain the DSA information set of that release plus all DSA information sets of earlier releases [Note: All supported software levels earlier than SSR 44.2 will use the 44.2 DSA information set.] Thus, installing a DSA keysfile is as simple as copying the most current DSA keysfile to one's Halt/Load family. However, only the DSA keysfile with the name *SYSTEM/ DSAKEYSFILE will be recognized by the system as the active system DSA keysfile. To install a DSA keysfile as the active DSA keysfile, the following command is used:

COPY<DSA keysfile filename>AS *SYSTEM/
DSAKEYSFILE TO <Halt/Load Pack> (PACK)

Signing and Verifying One's Own File
Obtaining One's Own Public/Private Key Pairs In order to add a digital signature to one's own files during the wrapping process, one must first obtain a public/private key pair. Generating key pairs involves in writing a program that interfaces with the new MCP procedure MCP_ GENERATEDSAKEYS. One may want to use the sample program listed at the end of this document to help one get the key pairs, or one may want to modify it to suit one's own needs.

Note that key pairs are generated based on an SSR level. This means one cannot use a private key of one SSR level to digitally sign wrapped files for another SSR level.

Creating Digitally Signed Wrapped Files

Once a key pair is generated, one can use the WFL WRAP syntax to create a digitally signed wrapped file. By passing the private key through the task attribute TASKSTRING of the WRAP statement, ones indicates the desire to add a digital signature to the file.

By default, the system will produce the signed container for the current software level. At times, one may want to create a digitally signed wrapped file for an SSR level different than that of the running system (for example, the recipient of the file may not be on the same SSR level as the operator). For such situations, one will need to specify the targeted SSR level for the WRAP statement through the task attribute TARGET. The level value should be represented as a whole number without the decimal point.

Distributing and Verifying Digitally Signed Wrapped Files

One can send the signed wrapped files to intended users. In order for these files to be verified and unwrapped, one also needs to send the corresponding public key to them. To ensure the wrapped files are not compromised in transit, one should avoid sending both signed files and public key at the same time. For instance, if using e-mail as the delivery mechanism, send the public keys in a separate mail message from the wrapped files they are protecting. If files are to be transferred over the Internet, one can allow the wrapped files themselves to be down loaded, but simply display the public key for the recipient to "cut and pastel" into the WFL WRAP statement, or offer to send the public key to the recipient via a provided e-mail address.

Recipients of the signed files should use the SFL UNWRAP syntax to verify and unwrap files, passing the public key one provided through TASKSTRING.

Dealing with Digital Signatures

One should not release one's private key because it may compromise the signed wrapped file's security.

Because both public and private keys are long hex strings, when one needs to execute many WRAP and UNWRAP statements dealing with digital signatures, it may be better for one to create a WFL job and associate the key values with string variables. For instance,
STRING PUBLICKEY,PRIVATEKEY;
PUBLICKEY:="<hex string for DSA public key>";
PRIVATEKEY:="<hex string for DSA private key>";
WRAP                         MYDIR/=INTO
MYCONTAINER;TASKSTRING=PRIVATEKEY;
UNWRAP=OUTOF
YOURCONTAINER;TASKSTRING=
PUBLICKEY;

Since wrapping files with digital signatures is processor-intensive, one should generally avoid creating many separate signed wrapped files. One may want to put them into one single signed container instead.

One should not trust files that are supposedly wrapped with digital signatures under conditions when the system does not either attempt to verify the signature or fails to do so.

Sample Program to Generate DSA Key Pairs
BEGIN

This sample program demonstrates the basic technique on how to generate DSA key pairs based on a specified SSR level. The resulting public and private key pairs then can be used in the WFL WRAP/UNWRAP statements to sign and verify signatured wrapped files.

```
FILE DSAKEYS (KIND=DISK, MAXRECSIZE=14, MINRECSIZE=14,
                        BLOCKSIZE=420, BLOCKSTRUCTURE=FIXED,
FILEKIND=DATA,
                        FRAMESIZE=48, NEWFILE=TRUE);
    LIBRARY MCP (LIBACCESS=BYFUNCTION,
FUNCTIONNAME="MCPSUPPORT.");
    REAL PROCEDURE MCP_GENERATEDSAKEYS (SOFTLEVEL,
NUMOFPAIRS, ARY,
                                    PROC, OPT);
```

-continued

```
        VALUE      SOFTLEVEL, NUMOFPAIRS, OPT;
        REAL       SOFTLEVEL, NUMOFPAIRS, OPT;
        ARRAY      ARY [0];
        REAL       PROCEDURE PROC (INX, PUBKEY, PRIKEY);
                   VALUE INX;
                   REAL INX;
                   ARRAY PUBKEY, PRIKEY [0]; FORMAL;
        LIBRARY    MCP;
    REAL PROCEDURE WRITEKEYPAIR (PAIRNUM, PUBKEY, PRIKEY);
    VALUE      PAIRNUM;
    REAL       PAIRNUM;
    ARRAY      PUBKEY, PRIKEY[0];
    BEGIN
        ARRAY      BUFF [0:13];
        DEFINE     WRITEIT       =
                        BEGIN
                            WRITE(DSAKEYS, 14, BUFF);
                            REPLACE POINTER(BUFF) BY "   " FOR 14
WORDS;
                        END #,
                   WRITEHEXSTR (PREFIX, ARY, INX, LEN) =
                        BEGIN
                            REPLACE POINTER(BUFF) BY PREFIX,
                            POINTER(ARY[INX],4) FOR LEN WITH
HEXTOEBCDIC;
                        WRITEIT;
                        END #;
        % Notify user about the progress. Useful if
USEUSERPROCF is set.
        DISPLAY ("Key pair #" !! STRING(PAIRNUM,*) !! "
generated.");
        % Keep key pair information secret. Write it out to
file.
        REPLACE POINTER(BUFF) BY "KEY PAIR #", PAIRNUM FOR
*   DIGITS, ":";
        WRITEIT;
        WRITEHEXSTR ("        PublicKey = ", PUBKEY, 0, 48);
        WRITEHEXSTR ("                    ", PUBKEY, 4, 48);
        WRITEHEXSTR ("                    ", PUBKEY, 8, 36);
        WRITEHEXSTR ("        PrivateKey = ", PRIKEY, 0, 48);
        WRITEHEXSTR ("                    ", PRIKEY, 4, 48);
        WRITEHEXSTR ("                    ", PRIKEY, 8, 36);
    END;
    DEFINE      % Returned value
                CODEF      = [15:08] #,
                SCODEF     = [31:16] #,
                % OPT word
                USEUSERARYF    = [01:01] #,
                USEUSERPROCF   = [00:01] #,
                % Others
                NUMRETKEYS     = KEYARY[0].[15:16] #,
                FIRSTKEY       = KEYARY[0].[31:16] #,
                NUMREQKEYS     = 4 #,               % Number of
requested keypairs
                KEYWORDS       = 11 #,              % Words for
each key
                SSRLEVEL       = 442 #;             % SSR Level
44.2
    REAL       R, I;
    ARRAY      KEYARY [0: (KEYWORDS*2*NUMREQKEYS)],
               PUBKEY [0:(KEYWORDS-1)],
               PRIKEY [0:(KEYWORDS-1)];
MAIN PROGRAM
Generate 10 DSA public/private key pairs for SSR level
44.2.
Because both USEUSERARYF and USEUSERPROCF return the same
information, we normally set either flag but not both.
This is just an example to illustrate how both cases
work.
    R := MCP_GENERATEDSAKEYS (SSRLEVEL, NUMREQKEYS,
KEYARY, WRITEKEYPAIR,
                                0 & 1 USEUSERARYF & 1
USEUSERPROCF);
    IF BOOLEAN (R) THEN
        DISPLAY ("DSA key generation Error #" !!
        STRING(R.CODEF,*) !!
                " - SubCode #" !! STRING(R.SCODEF,*));
If USEUSERARYF is set, process the returned info.
    IF (NUMRETKEYS GTR 0) THEN       % Got some good key
```

-continued

```
pairs
    BEGIN
        FOR I:=1 STEP 1 UNTIL NUMRETKEYS DO
            BEGIN
                R := ((I-1) * 2 * KEYWORDS) + FIRSTKEY;
                REPLACE POINTER(PUBKEY) BY
POINTER(KEYARY[R])
                                                FOR KEYWORDS
WORDS;
                REPLACE POINTER(PRIKEY) BY
POINTER(KEYARY[R+KEYWORDS])
                                                FOR KEYWORDS
WORDS;
                WRITEKEYPAIR (I, PUBKEY, PRIKEY);
            END;
        END;
    LOCK (DSAKEYS);
END.
```

Verifying and Unwrapping Single Files

Referring to FIG. 3A, there is seen the steps involved in the overall process of verifying and unwrapping single files. The sequence is started in one of two alternative ways designated as S1 or S2.

At S1, the User initiates the unwrapping with digital signature toy using the WFL (Work Flow Language) unwrap statement for single files and passing a public key.

Alternatively at S2, the User initiates unwrapping with digital signature by using a program that calls MCP__FILEWRAPPER passing the unwrap action together with a public key.

At step S3, the WFL (Work Flow Language) compiler 15 parses the command and makes a request to the operating system 14 to initiate the MCP__FILEWRAPPER routine 36 as a separate process.

Figure 3B:
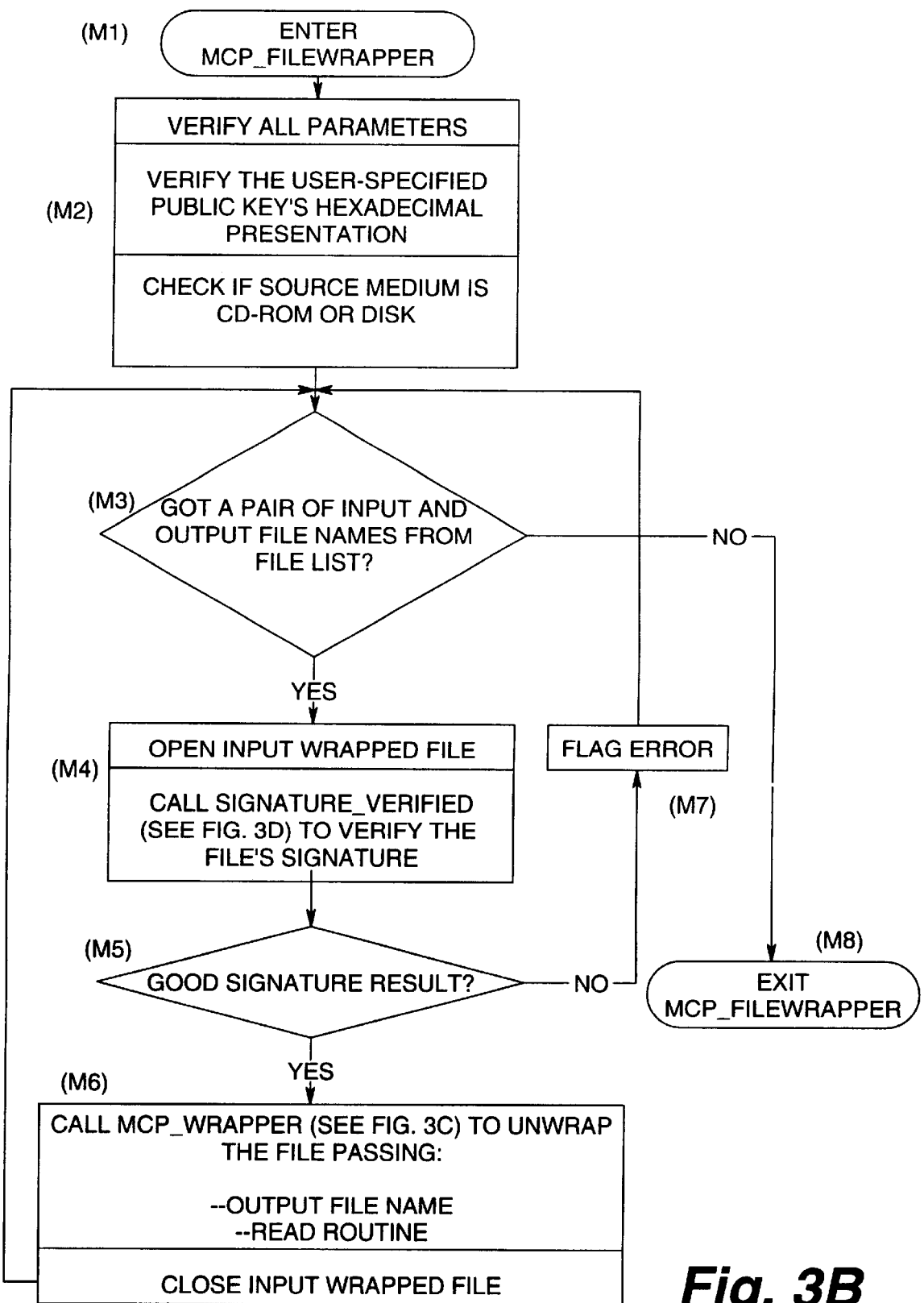
FIG. 3B is a flow chart illustrating the MCP_FILEWRAPPER LOGIC to digitally verify an unwrapped single file.

At step S4, the MCP__FILEWRAPPER Routine 36 is executed as per FIG. 3B, with the following elements:—the file list containing the Input and Output file names and—the public key.

At step S5, the MCP__FILEWRAPPER, illustrated in FIG. 3B, exits to the Operating System 14, or a User program in operator terminal 8.

At step S6, this ends the sequence.

The sequential steps involved in the MCP__FILEWRAPPER routine is shown in FIG. 3B hereinunder.

In order to digitally verify and unwrap single files, there is a sequence of steps within the MCP__FILEWRAPPER routine which is illustrated in FIG. 3B.

Referring to FIG. 3B, the MCP__FILEWRAPPER program is initiated in the Master Control Program 10 of FIG. 1B.

At step M2, all parameters are verified, then a verification is made of the User-specified public keys hexadecimal presentation, and then a check is made to see if the source medium is a CD-ROM or a disk.

At step M3, the routine will see about getting a pair of Input and Output names from the file list. If none are available, there will be an exit of the MCP__FILEWRAPPER program at step M8.

If there is a pair of Input file names from the file list at step M3, then the sequence proceeds to step M4 to open an Input wrapped file. Then, the routine designated Signature__Verified routine, as per FIG. 3D, is initiated in order to verify the file's signature.

Figure 3C:
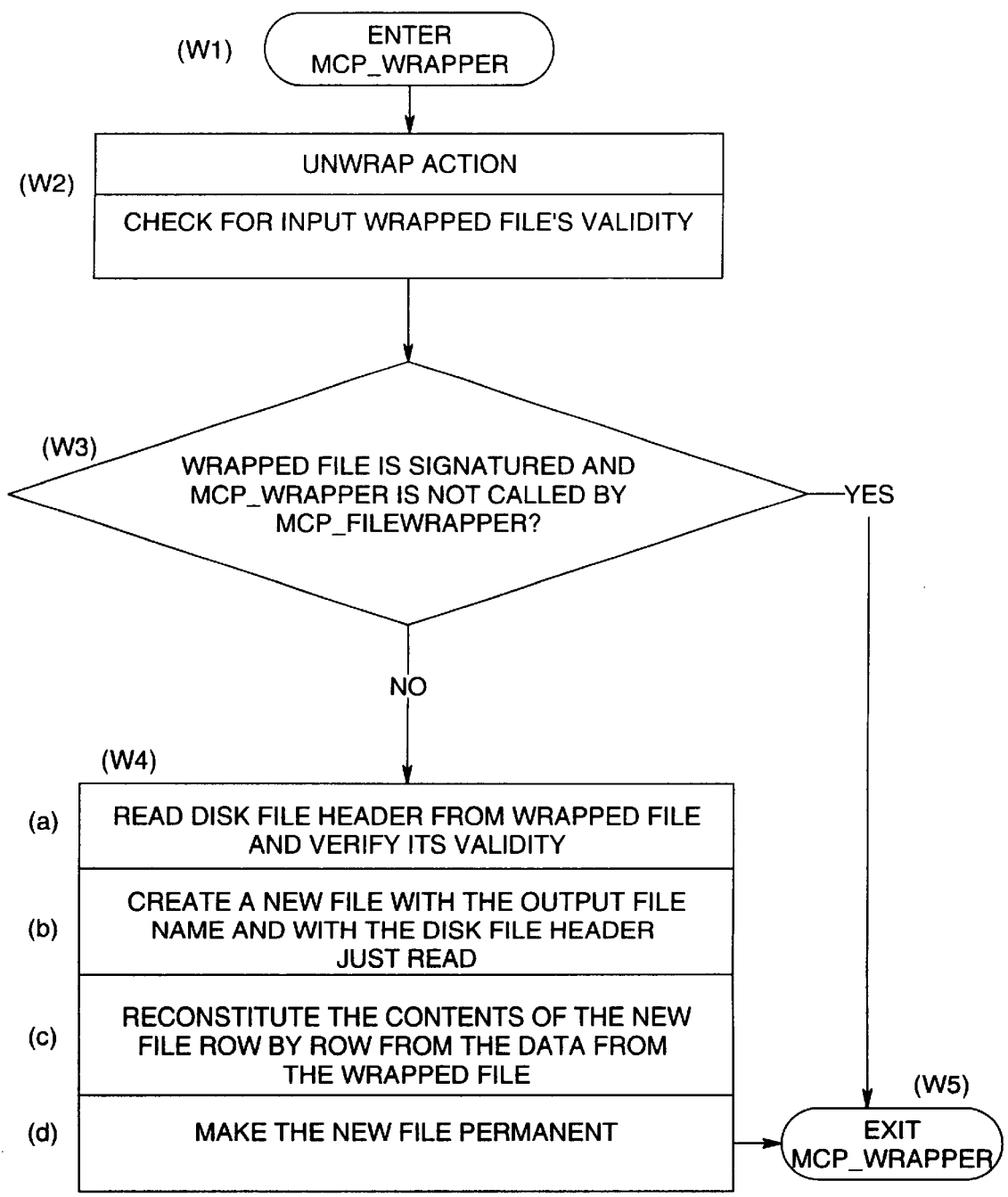
FIG. 3C is a flow chart illustrating the MCP_WRAPPER's generalized logic for unwrapping a single wrapped file.
Figure 3D:
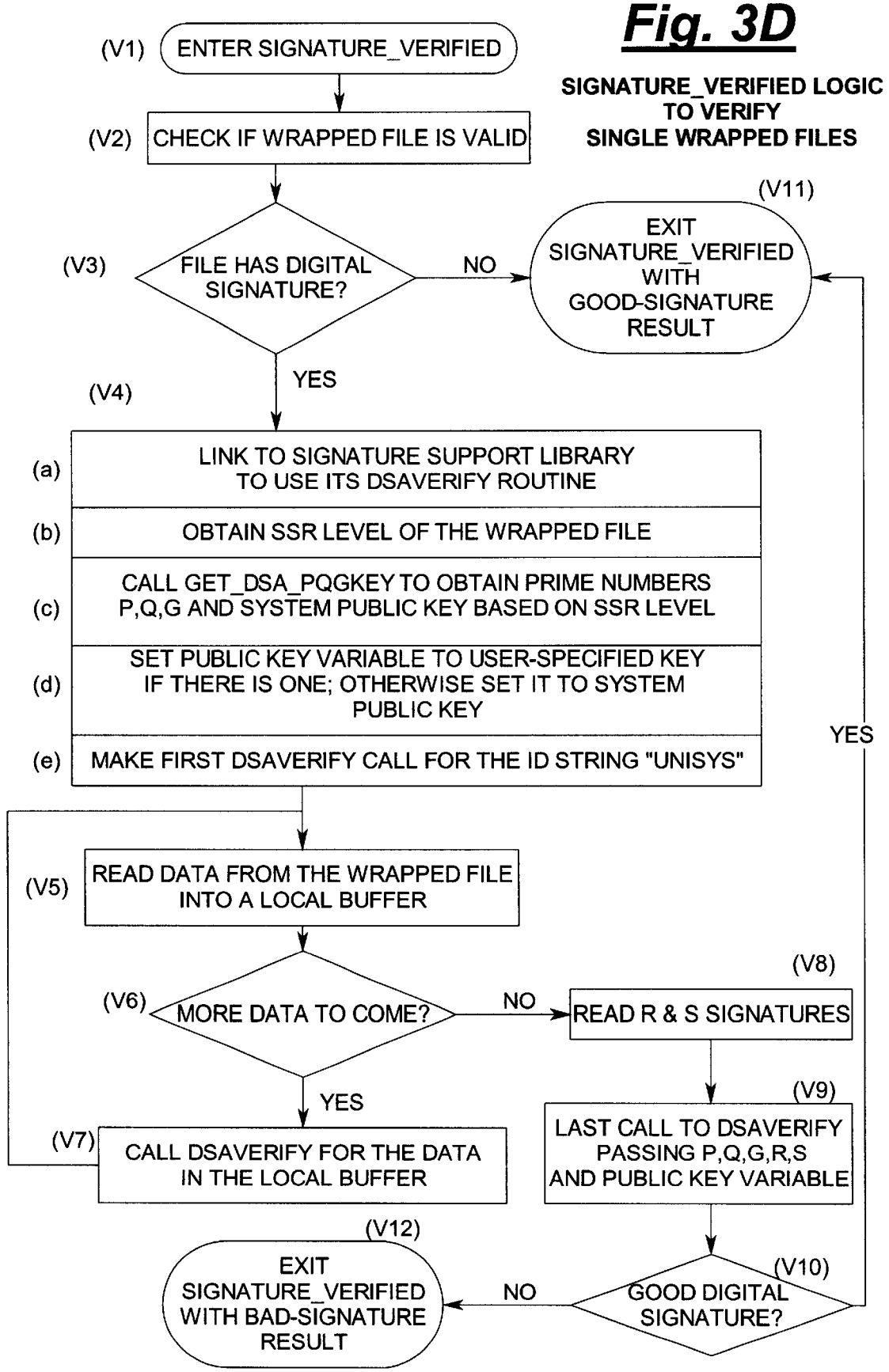
FIG. 3D is a flow chart illustrating the steps involved for the Signature_Verified Logic used to verify single wrapped filers.
Figure 4:
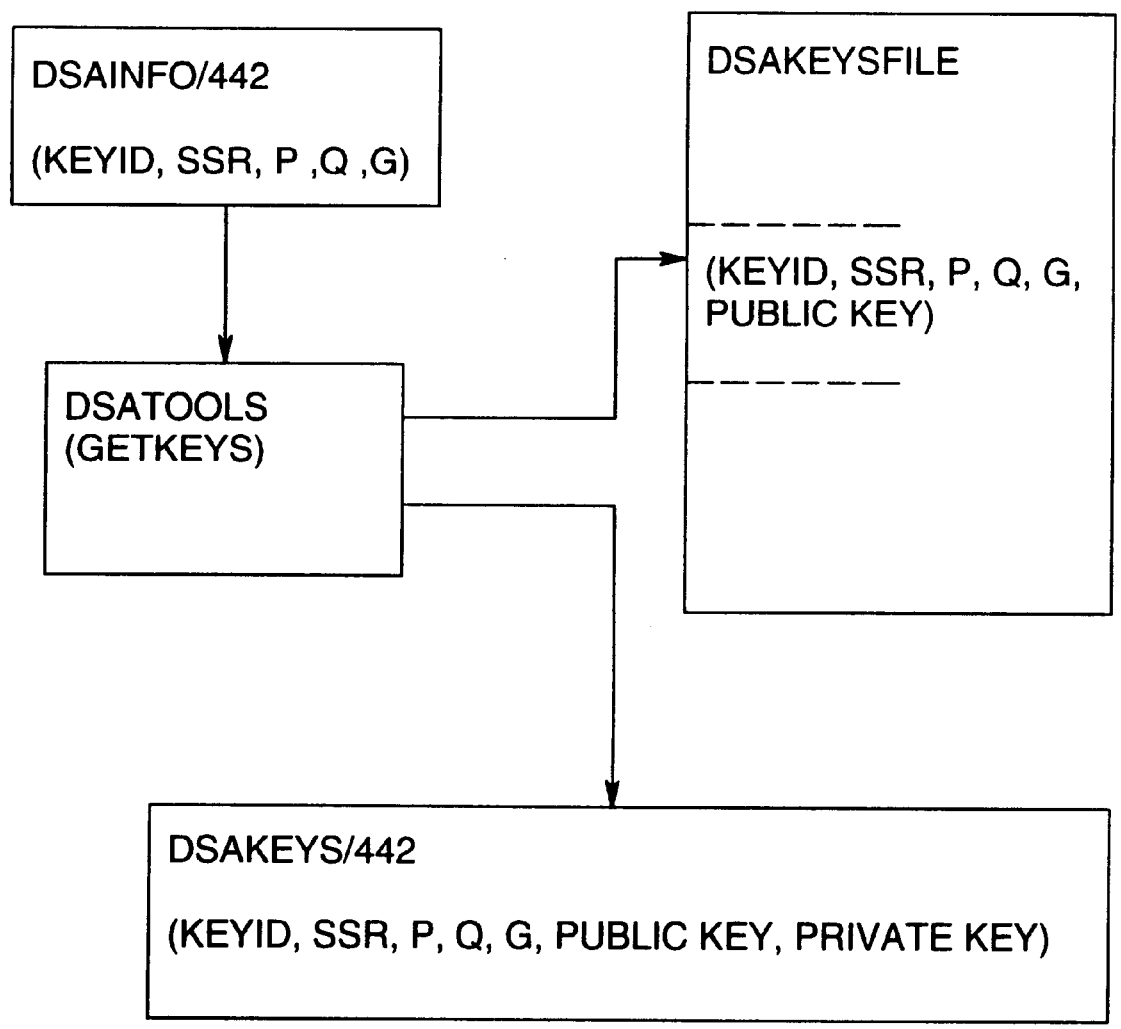
FIG. 4 is a diagram showing the creation of DSAKEYSFILE.

At step M5, a decision point will check to see if the signature is a good signature result, and if it is, the sequence will proceed to step M6 which then will call the programmatic routine 38 designated MCP__WRAPPER, as illustrated in FIG. 3C, which works to unwrap the file while passing the Output file name and a Read routine, after which there is a closure of the Input wrapped file.

At this stage, the sequence can return from step M6 (FIG. 3B) over to step M3, M4, M5, and back to step M6.

The step M6 of FIG. 3B involves the MCP__WRAPPER routine in order to unwrap the file.

FIG. 3C illustrates the sequential steps involved in the MCP__WRAPPER routine.

Referring to FIG. 3C, the initiation at step W1 involves the entering of the MCP__WRAPPER routine.

At step W2, the unwrap action is initiated and a check is made for the Input wrapped file's validity.

At step W3, a decision block is involved where the wrapped file is signatured and the routine MCP__WRAPPER is not called by the MCP__FILEWRAPPER program.

At step M4, if the MCP__WRAPPER is not called (YES), then step W5 indicates an exit of the MCP__WRAPPER routine.

If the MCP__WRAPPER is called (NO), then step W4 indicates a series of operations, where W4a shows the sequence of reading the Disk File Header from the Wrapped file in order to verify its validity;

Then at step W4b, there is created a new file with the Output files name and with the Disk File Header which had just been read;

Then at step W4c, there is a reconstitution of the contents of the new file, row by row, from the data from the wrapped file;

Then at step W4d, the new file is made as a permanent file, after which the sequence goes to step W5 to exit the MCP__WRAPPER routine;

FIG. 3D is a flow chart illustrating the routine designated Signature__Verified logic which is used to verify single wrapped files;

Referring to FIG. 3D, at step V1, the routine is entered for a Signature__Verified sequence;

At step V2, a check is made if the wrapped file is valid;

At step V3, a decision block is used to determine if the file has a digital signature;

At V3, if there is no digital signature, then step V11 occurs to exit the Signature__Verified routine with a Good__Signature result;

At step V4, if the file does have a digital signature (YES), then step V4 occurs in a series of functions;

At step V4a, a link is made to the Signature Support Library 13 in order to use its DSA Verify routine;

Then at step V4b, the sequence will obtain the SSR level of the wrapped file;

Then at step V4c, a call will be made to the routine designated GET_DSA_PQGKEY in order to obtain the prime numbers P,Q,G and also the system public key which is based on the SSR level;

Then at step V4d, the public key variable is set to the User-specified key, if there is one otherwise, it is set to the system public key;

At step V4e, then the sequence will make the first DSA_Verify call for the ID string source company which in this case, is designated as "Unisys";

At step V5, data is read from the wrapped file into a local buffer, such as memory 18;

At step V6, a decision block occurs as to whether there is more data to come. If there is no more data to come (NO), then step V8 will Read the R & S signatures and proceed to step V9;

is At step V9, there is a final call to the DSAVERIFY while passing the parameters P,Q,G,R,S and a variable public key over to step V10;

At step V10, a decision block occurs as to whether it is a good digital signature. If the answer is (YES), then procedure is done to step V11 where there is an exit of the Signature_Verified routine with a Good_Signature result;

At step V10, if it was not a good digital signature, the procedure then occurs at step V12, where an exit is made of the Signature_Verified routine with a Bad_Signature result.

Described herein has been a method and system whereby standardized byte stream data files which are utilizable for transfer over the Internet, or for many types of platforms such as the NT and UNIX platforms, can subsequently be "unwrapped" and re-converted back into their native specialized format, including all their attributes which are suitable for working with a specialized proprietary computer system. A major function of the unwrapping process described herein has been the use of signatures which have been developed to add into the data file so that the signature can be checked so as to verify the integrity of the data file. Thus, the unwrapped data file will have a signature of two sets of multiple words designated R and S, which can be checked in order to verify the integrity of the reconstituted natives specialized proprietary file after being transformed from a byte stream industry-standard data file.

While other variations and embodiments of the described method may, be implemented for various purposes, the invention is defined by the following claims appended herein.

What is claimed is:

1. A method, initiated by a source-user, for reconstituting (unwrapping) specialized original native data files which had been wrapped into an industry byte stream data file, comprising the steps of:
   (a) entering an unwrap command unto a computer platform;
   (b) accessing a wrapped file from a CD-ROM (Wrapped\File\CD,21), or a wrapped file imported from an open network, said wrapped file consisting of a byte stream data file (with digital signature) to be processed for conversion to an original specialized native data file;
   (c) verifying said signature to insure the integrity of the data file;
   (d) executing, when said signature is properly verified, programmatic interface means which converts said industry-standard byte stream text files into said specialized original native files;
   (e) placing said unwrapped file onto a storage media.

2. A method for verifying and unwrapping a signatured wrapped file comprising the steps of:
   (a) establishing DSA KEYSFILE which holds parameters of KeyID, SSR, P, Q, G and a system public key;
   (b) establishing signatured words R and S for the file which is wrapped and exists in industry-standard byte stream text format file;
   (c) utilizing an Unwrap operation which accesses said parameters of said DSA keys files and which accesses said signatured file with said R and S words;
   (d) executing an Unwrap operation to the parameters and signatured file in order to develop the reconstituted specialized original native file.

3. In a network having a first computer platform (14) which utilizes an specialized original native format file and a second platform (30) which uses an industry-standard byte stream text data format file with digital signature, (wrapped file), a method for converting and reconstituting said industry-standard byte stream text data file (wrapped file) into a specialized original native file (unwrapped) useable by said first computer platform comprising the steps of:
   (a) accessing said industry-standard byte stream data file 21 with digital signature from an open network (40) by transmission to said second platform (30);
   (b) storing, by said second platform (30) of said accessed industry-standard byte stream data file and signature, (24, Disk C);
   (c) receiving and processing by said first platform (14) of said byte stream data file (wrapped file) including:
      (c1) verifying the signature (36,13,36y) of said wrapped data file in order to validate the integrity of the transmitted file;
      (c2) processing said byte stream data file (wrapped file) by said first computer platform (14) using its own operating system (10) and programs to convert said wrapped industry-standard byte stream data file into an unwrapped specialized original native data file;
   (d) placing said unwrapped storage file (21d) after verification onto a storage medium (20) usable by said first computer platform (14).

4. The method of claim 3 wherein step (c1) includes the step of:
   (c1a) calling a first program routine (36) (MCP_FILEWRAPPER) which utilizes a special verification routine (DSAVERIFY) from a Signature Support Library (13) to validate the integrity of the transmitted byte stream data file.

5. The method of claim 3 wherein step (c2) includes the step of:
   (c2a) executing a second program routine (38) (MCP_WRAPPER), after signature verification, to convert (unwrap) said byte stream data file into said original specialized native data file.

6. In a computer platform operating on a specialized original native format data file and Disk File Header, a method for converting an industry-standard byte stream data file with signature back to said original specialized native format data file comprising the steps of:
   (a) initiating an unwrap operation on said byte stream data file with digital signature including entering a public key by a user;
   (b) executing a MCP_FILEWRAPPER routine (36) to verify the user specified public key and into verify the file's signature;

(c) calling a MCP_WRAPPER program (38) to unwrap the verified file in order to reconstitute the accessed byte stream data file and signature into the original specialized native format file.

7. The method of claim 6 wherein step (b) for signature verification includes the steps of:

(bi) checking for validity of the wrapped file;

(bii) checking to see the file has a digital signature;

(biii) calling a Signature Support Library (13) to use a verification routine which then reads the digital signature;

(biv) verifying that the signature is the proper value.

8. The method of claim 7 where step (biii) includes the steps of:

(a) obtaining the System Software Release (SSR) level of the wrapped file;

(b) calling the routine GET_DSA_PQGKEY in order to obtain the prime numbers P,Q,G and the system public key which is based on the System Software Release (SSR) level;

(c) reading the data from the signed wrapped file to a local buffer and calling the program DSAVERIFY to develop signature words (R,S) where R and S are a series of digital words.

9. In a computer platform utilizing a Signature Support Library, anew operating on a specialized original native format data file and disk File Header (DFH), a system for receiving and utilizing an industry-standard byte stream data file having a digital signature in order to decode and reconstitute said byte stream data file into said specialized original native format data file after execution of a signature integrity verification program, said system comprising:

(a) means for accessing said industry-standard byte stream data file and signature;

(b) means to verify said digital signature portion of said reconstituted byte stream files in order to verify the integrity of said files;

(c) program means to reconvert said accessed byte stream data file into a resultant file or said specialized original native files after signature verification;

(d) means to place said resultant verified file on a storage medium for use by said computer platform.

10. The system of claim 9 wherein said means to verify said digital signal includes:

(a) first program means (MCP_FILEWRAPPER) to access said Signature Support Library;

(b) said Signature Support Library for calling a verification routine (DSAVERIFY) which validates said signature;

(c) second program means (MCP_WRAPPER) for converting, after signature verification, said byte steam data file into a verified specialized original native file.

11. In a first computer platform operating on a specialized original native formatted file, a system for verifying and unwrapping a wrapped byte stream data file into said original specialized native formatted file, comprising:

(a) means to access a signatured byte stream text data file;

(b) means to access a Digital Signal Algorithm (DSA) Keysfile holding a set of specialized parameters and system public key;

(c) means to combine said DSA Keysfile with said signatured byte stream text data file to verify said data file's integrity;

(d) means to execute an Unwrap operation on said verified data file in order to reconstruct said specialized original native file after verification of said signature.

12. The system of claim 11 where said set of specialized parameters include:

(i) a KEYID;

(ii) a System Software Release level (SSR);

(iii) a random group of prime numbers designated P,Q,G.

* * * * *